No. 771,506. PATENTED OCT. 4, 1904.
A. C. STILES.
JOURNAL BEARING.
APPLICATION FILED DEC. 12, 1903.
NO MODEL.
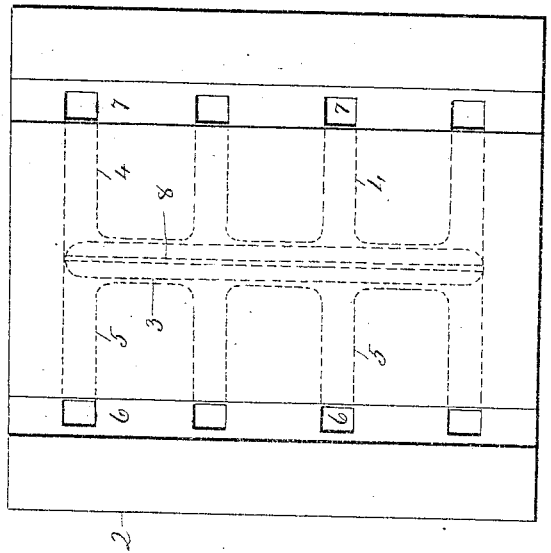
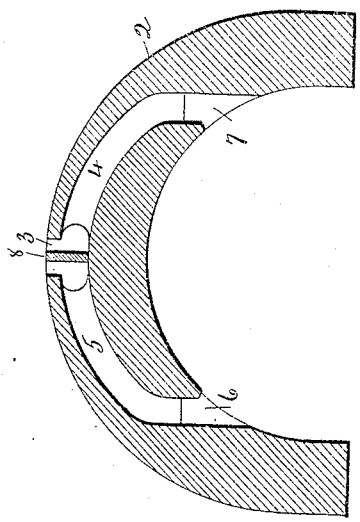

No. 771,506. Patented October 4, 1904.

UNITED STATES PATENT OFFICE.

ALBERT C. STILES, OF NEW HAVEN, CONNECTICUT, ASSIGNOR TO THE A. C. STILES METAL COMPANY, OF NEW HAVEN, CONNECTICUT, A CORPORATION OF CONNECTICUT.

JOURNAL-BEARING.

SPECIFICATION forming part of Letters Patent No. 771,506, dated October 4, 1904.

Application filed December 12, 1903. Serial No. 184,898. (No model.)

*To all whom it may concern:*

Be it known that I, ALBERT C. STILES, of New Haven, in the county of New Haven and State of Connecticut, have invented a new and useful Journal-Bearing; and I do hereby declare the following, when taken in connection with the accompanying drawings and the figures of reference marked thereon, to be a full, clear, and exact description of the same, and which said drawings constitute part of this specification, and represent, in—

Figure 1, an inside view of a journal-bearing constructed in accordance with my invention; Fig. 2, a transverse sectional view thereof.

This invention relates to an improvement in journal-bearings, and while particularly intended for locomotive-bearings is applicable for various other purposes where a bearing necessary to be lubricated is required.

In the general construction of journal-bearings the passages for oil extend through the crown of the bearing, and consequently but a small portion of the surface of the journal is lubricated, and, furthermore, the opening for the passage of oil through the crown of the bearing weakens the bearing at its point of greatest wear.

The object of this invention is to provide a bearing which may be lubricated throughout substantially its entire surface and by which the lubricating material will be equally distributed; and the invention consists in the construction as hereinafter described, and particularly recited in the claims.

As herein shown, the bearing 2 is of substantially usual form and at the crown is formed with a longitudinal groove 3, from which passages 4 and 5, more or less in number, lead transversely to longitudinal channels 6 and 7, formed in the inner face of the bearing at points considerably removed from the crown of the bearing.

The walls of the channels 6 7 are substantially parallel with the vertical axis of the bearing and so that as the bearing becomes worn the relative position of the channels is not altered. If desired, a web 8 may be arranged in the groove 3, so as to divide it longitudinally. Lubricating material is applied to the bearing through the groove 3 and passes through either of the passages 4 5 into the channels 6 7. It is only necessary, however, that one of the channels be filled with lubricating material, and the one depends upon the direction in which the journal is to turn, as lubricating material will be carried from one of the channels over the remaining surface of the bearing. If the journal is to be lubricated through the channel 6, the passages 5 and channel 7 may be filled with tallow, and so that if the lubricating material in the channel 6 becomes exhausted the heating of the journal due to the lack of lubricating material will melt the tallow in the channel 7 and temporarily supply lubrication. In journals which are to be used largely in both directions both channels may be filled with lubricating-oil. By distributing the oil to the sides of the bearing the entire surface of the bearing is more perfectly lubricated and the crown of the bearing left intact, so that more perfect wear is assured. Thus the life of the journal is materially lengthened. The grooves, passages, and channels are readily formed in casting, so that the cost of manufacture is not increased.

Having fully described my invention, what I claim as new, and desire to secure by Letters Patent, is—

1. A journal-bearing having a central longitudinal groove in its outer face, an open longitudinal channel in the inner face at one side of the longitudinal center thereof, and passages connecting said groove and channel, substantially as described.

2. A journal-bearing having a central longitudinal groove in its upper face, open longitudinal channels in its inner face on opposite sides of the longitudinal center, and passages connecting said grooves and channels, substantially as described.

3. A journal-bearing having a central longitudinal groove in its upper face, a web dividing said groove longitudinally, there being longitudinal channels in the inner face of said bearing on opposite sides of the longitudinal center thereof, and passages connecting said grooves and channels, substantially as described.

In testimony whereof I have signed this specification in the presence of two subscribing witnesses.

ALBERT C. STILES.

Witnesses:
  FANNY METZGER,
  HENRY C. BRETZFELDER.